F. J. SINGER.
RADIATOR.
APPLICATION FILED MAY 2, 1917.
1,313,212.
Patented Aug. 12, 1919.
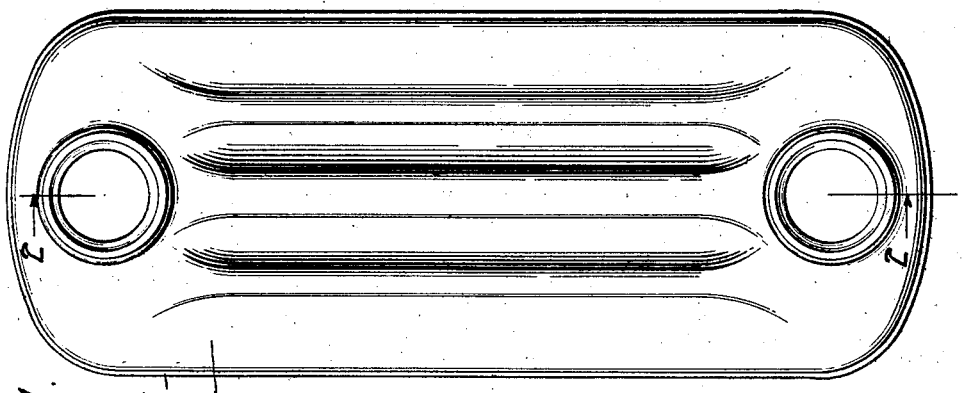
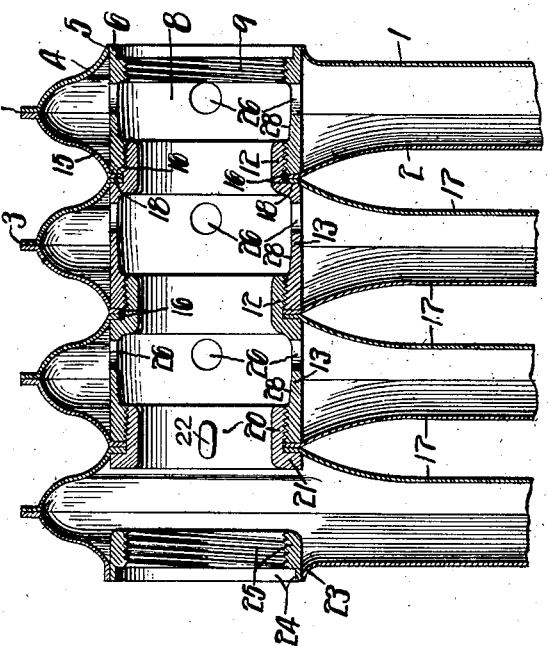
Inventor
Frank J. Singer,
By Pagelsen & Spencer
Attorneys

UNITED STATES PATENT OFFICE.

FRANK J. SINGER, OF DETROIT, MICHIGAN, ASSIGNOR TO AMERICAN PRESSWELD RADIATOR CORPORATION, OF DETROIT, MICHIGAN, A CORPORATION OF DELAWARE.

RADIATOR.

1,313,212.   Specification of Letters Patent.   Patented Aug. 12, 1919.

Application filed May 2, 1917. Serial No. 165,811.

*To all whom it may concern:*

Be it known that I, FRANK J. SINGER, a citizen of the United States, and residing at Detroit, in the county of Wayne and State of Michigan, have invented a new and Improved Radiator, of which the following is a specification.

The object of the present invention is to provide a sheet metal radiator which can be easily assembled, which is formed of few parts, and which possesses the requisite stiffness. To these ends, one element of the invention lies in the use of a single member for each of the intermediate sections whereby the particular section is both rigidly connected to an adjoining section and has its walls properly spaced from one another. Another element of the invention is a single combined connecting and spacing member welded or fused to the outer wall of one of the end sections, whereby said section is connected to an adjacent section and whereby its walls are properly spaced from one another. The invention also includes features whereby the objectionable dripping of water of condensation into the troughs at the bottom of the radiator sections is avoided. The invention also consists in the details of construction shown, described and claimed.

In the drawings Figure 1 is a side elevation of a radiator in which the invention is embodied. Fig. 2 is a section on the line 2—2 of Fig. 1.

The radiator shown has openings for pipe connections at both top and bottom but it will be understood that the connection may be only at the bottom. In other words, the top openings may be plugged.

The right hand end section (Fig. 2) is formed of the thin sheet metal half sections 1 and 2 having out-turned marginal flanges welded together at 3. The half section 1 is shaped to form a perforated boss 4 that terminates in an annular flange 5, the latter of which is preferably welded to a thin annular flange 6 on the tubular combined spacing and connecting member 8. The member 8 is preferably of cast metal and has its outer end internally threaded at 9 to receive a suitable fitting; at its inner end it is also internally threaded to receive the reduced end 12 of the combined spacing and connecting member 13 for the adjacent intermediate section. The half section 2 is bossed at 15 and includes the inturned annular flange 16, and the adjacent half-section 17 differs from the half-section 2 only in matter of arrangement. It will be seen that the member 13 includes a shoulder 18 between which and the end of the member 8 the flanges 16 are tightly compressed when the member 13 is screwed into the member 8. The remaining intermediate sections and combined spacing and connecting members are duplicates of that just described.

The left end section is, however, shown connected to the adjacent intermediate section by a nipple 20 having an outturned flange 21 and lugs 22 for receiving a wrench. The outer half of the end section includes a flange 23 welded to a flange 24 of substantially the same thickness, which constitutes a part of the threaded reinforcing member 25 into which the pipe or plug, as the case may be, is screwed.

For the purpose of allowing the steam or water to flow through the members 8 and 13 to or from the corresponding sections, and also in order to allow the application of a suitable wrench to draw the sections together, the connecting members are provided with perforations 26. These perforations are also preferably located near enough to one end of the members to cause water of condensation dripping from the edge of the opening to strike the wall of the section, which avoids the objectionable sounds due to the splashing of the drops directly into the pools at the bottom of the sections. It is preferable to incline the inner surfaces of the connecting members toward the openings, as indicated at 28.

The construction is exceedingly cheap and durable, and may be readily assembled or dismantled, which is of importance in shipping and in the renewal of sections. Another advantage lies in the fact that steam being admitted does not at first strike directly on the walls of the sections, but must first pass through the relatively tight coupling members, which reduces the noise. The details may, of course, be changed considerably without departing from the spirit of the invention.

I claim:—

1. A sheet metal radiator including an intermediate section and an end section having perforated annular flanges lying substantially in the same plane, a combined spacing and connecting member inclosed by the intermediate section, said member being adapted to space the walls of the section apart and having an internally threaded end arranged to bear upon the inner face of the intermediate section around the perforation therein, and a nipple having an externally threaded portion projecting through the perforations in the sections and threaded into the combined spacing and connecting member, said nipple having an annular flange thereon within the end section arranged to bear upon the inner wall of said end section around the perforation therein.

2. A sheet metal radiator comprising a section having alined perforations in its opposite sides, and a tubular spacing member arranged to bear upon the inner surfaces of the section around the perforations through which fluid may pass from one section to another, said section being of greater width near the perforations than elsewhere, said tubular spacing member having a lateral opening close enough to one end to cause water which may condense therein to drip onto the adjacent side wall of the radiator.

FRANK J. SINGER.

Copies of this patent may be obtained for five cents each, by addressing the "Commissioner of Patents, Washington, D. C."